United States Patent [19]

Horii

[11] Patent Number: 4,721,126
[45] Date of Patent: Jan. 26, 1988

[54] METHOD OF GENERATING SPIRAL FLUID FLOW AND THE DEVICE THEREFOR

[76] Inventor: Kiyoshi Horii, 5-8-15-501, Kamimeguro, Meguro-ku, Tokyo, Japan

[21] Appl. No.: 904,424

[22] Filed: Sep. 8, 1986

[30] Foreign Application Priority Data

Sep. 9, 1985 [JP] Japan .................. 60-197620

[51] Int. Cl.$^4$ ........................................... F16K 11/00
[52] U.S. Cl. ...................................... 137/1; 137/808; 137/888; 137/889; 417/197
[58] Field of Search ................ 137/1, 13, 888, 889, 137/808, 811; 417/194, 197

[56] References Cited

U.S. PATENT DOCUMENTS

| | | | |
|---|---|---|---|
| 3,047,208 | 7/1962 | Coanda | 417/197 X |
| 3,099,965 | 8/1963 | Regenscheit | 417/197 |
| 3,795,367 | 3/1974 | Mocarski | 417/197 X |
| 3,822,721 | 7/1974 | Verschuur | 137/13 X |

FOREIGN PATENT DOCUMENTS

| | | | |
|---|---|---|---|
| 2111125 | 6/1983 | United Kingdom | 417/197 |
| 1051503 | 10/1983 | U.S.S.R. | 137/808 |

OTHER PUBLICATIONS

Study of Spiral Flow Phenomemon In A Cylindrical Pipe, Horii et al., Trans. Japan Soc. Aero. and Space Sciences, 1985.
Preprint w/translation, Study on Coanda Spiral Flow, Horii et al., 1986.

Primary Examiner—Robert G. Nilson
Attorney, Agent, or Firm—Armstrong, Nikaido, Marmelstein & Kubovcik

[57] ABSTRACT

A spiral fluid flow is available for conveying, drying or separating pulverulent substances particle substances, slurries or gases. To obtain a high speed stable spiral fluid flow, there is used a device provided with a slit formed between a main conical cylinder connected to a pipe line and a subcylinder connected to the main cylinder on the opposite side remote from the pipe line, and a pressurized fluid is supplied through this slit. The device is also provided with a pressurized fluid supply section.

6 Claims, 11 Drawing Figures

METHOD OF GENERATING SPIRAL FLUID FLOW AND THE DEVICE THEREFOR

BACKGROUND OF THE INVENTION

The present invention relates generally to a method of generating a spiral fluid flow and a device therefore. The spiral fluid flow is available in a wide range of various industrial fields for conveying, separating, mixing or effecting chemical reactions of pulverulent substances, particle substances, liquids such as petroleum, gases such as air, natural gas, etc.

DESCRIPTION OF THE PRIOR ART

In general, liquids and gases are called fluids. A fluid has a characteristic feature of flowing, and the flowing phenomenon is termed "flow". The surface of a substance in contact with a fluid is subjected to pressure and friction force applied from the fluid, and the magnitude thereof varies according to the flowing conditions of the fluid. The organization of the flow and the problem of force applied to a substance from the flow is determined by as well as the mutual operation between the flow and an object.

In the fluid phenomenon, fluid has such a property as to become a tubulent flow when the flow speed exceeds a critical value. That is, fluid changes to turbulence at a boundary between the substance surface and the fluid, in a wake of a substance or in a jet stream, when the flow speed increases. It has been considered that turbulence is a stream having no regularity however, recently it has been clarified more and more that some systematic organization exists even in turbulence.

When considering the systematic organization apt to be formed in tubulence, the phenomenon of nature is taken as the subject of analogy. There exist an equilibrium and a non-equilibrium in the nature, and it is considered that a nonequilibrium changes to an equilibrium. During this process, an a nonequilibrium system disperses free energy to increase the entropy within the system. In general chemical reactions, the territory of reaction organically changes on the basis of the equilibrium condition between energy and entropy, and further the self-organization can be determined on the basis thereof.

In the self-organization process, the equilibrium condition is considered to be attained when microscopic fluctuations cancel each other, but rather it is considered that macroscopic organization can be formed when fluctuations are amplified. This macroscopic organization can be considered as the systematic organization in turbulence. It has been clarified that spiral pattern exists as one of the macroscopic or systematic organization.

The discovery of a spiral pattern different in concept from conventional turbulence provides not only a new scientific viewpoint with respect to fluid movement, but also a large expectation such that a new technical field utilizing the spiral movement can be developed.

The inventors have deepened the scientific knowledge and information as to the above-mentioned new spiral fluid movement, and have made efforts to develop technique for the new fluid flow. As a result, it has been known that this spiral movement forms a dynamic boundary layer on the inner wall of the pipe line, being different from turbulence, thus resulting in high speed spiral fluid flow in the axial direction of the pipe line. In addition, it has been found that pulverulent substances can be conveyed at a high speed while suppressing the collision thereof against the inner wall surface of the pipe line by utilization of this phenomenon. The inventors have already proposed a number of new techniques belonging to the fluid movement as follows:

Japanese Published Unexamined Patent Appl. No. 60-31437 disclosed "Method of Conveying Particle bodies by Spiral Stream", in which when a spiral stream is generated in a pipe line and solid particles are supplied into a spiral stream area, the solid particles can be conveyed within the pipe line in spiral movement without contact with the pipe line wall.

Additionally, the other inventions to which a spiral stream is applied are as follows:

Japanese Published Unexamined Patent Appl. No. 60-34269 discloses "Spray Grinding Method by Spiral Stream".

Japanese Published Unexamined Patent Appl. No. 60-48825 discloses "Method of Conveying Particles by Complementary Spiral Stream".

Japanese Published Unexamined Patent Appl. No. 60-48473 discloses "Method of Drying or Concentrating Pulverulent Substances including a Volatile Matter or Slurry".

Japanese Published Unexamined Patent Appl. No. 60-51528 discloses "Method of Separating a Mixed Gas by Spiral Stream".

Japense Published Unexamined Patent Appl. No. 60-51581 discloses "Separating Method of Pulverulent Granular Substances".

Japanese Pulished Unexamine Patent Appl. No. 60-53792 discloses "Separating Method of Heat by Spiral Stream".

Japanese Published Unexamined Patent Appl. No. 60-54729 discloses "Method of Promoting Chemical Reactions by Spiral Stream".

Japanese Published Unexamined Patent Appl. No. 60-59238 discloses "Dredging Method Using a Spiral Stream".

As described above, a spiral stream within a pipe line represents an extremely interesting behavior, and therefore the phenomenon is applicable to a wide industrial field.

Further, although the concept of a decvice for generating a stable spiral stream within a pipe line is disclosed in the above-mentioned various documents, the device is also disclosed further practically in Japanese P. U. Pat. No. 60-56723 "Device for Generating Stable Stream in Pipe Line".

In the above-mentioned techniques proposed by the same inventions, however, the speed of spiral flow is not so high as about 10 to 20 m/sec in average, because the spiral flow is to be applied to various industries. In addition, these exists a problem in that the stability of the spiral flow is not sufficient. This is because in the already proposed techniques, a non-compression stream having a vector of only the substantially axial direction of the pipe line is introduced into the guide line.

Therefore, there has been a strong demand for developing another new technique in order to utilize the spiral movement known as a new fluid movement for various industrial fields.

SUMMARY OF THE INVENTION

With these problems in mind, therefore, it is the primary object of the present invention to provide a method of generating a new spiral flow having a high flow speed and an excellent stability in spiral movement so as to effectively convey a fluid and, a device for realizing the above-mentioned, while solving the drawbacks involved in the afore-mentioned conventional techniques.

To achieve the above-mentioned object, the method of the present invention is characterized in that there is used a device having a structure such that a subcylinder is connected via an annular slit to an end of a large diameter side of a main cylinder having a body with a diameter larger than that of a pipe line, a wall surface of the annular slit on the main cylinder side being smoothly curved so as to change to an inner wall of the main cylinder, a wall surface of the annular slit on the subcylinder side being bent so as to change to an inner wall of the subcylinder, an opposite end of the main cylinder being gradually reduced in diameter to such an extent as to be equal to a diameter of the pipe line in conical shape for connection with the pipe line, and that a pressurized gas is supplied to the annular slit to generate a spiral fluid flow in the pipe line.

Further, the device of the present invention is provided with means for supplying a pressurized gas.

DETAILED DESCRIPTION OF THE INVENTION

The method of generating a spiral flow and a device therefor according to the present invention will be described in further detail with reference to the attached drawings.

Figure 1:
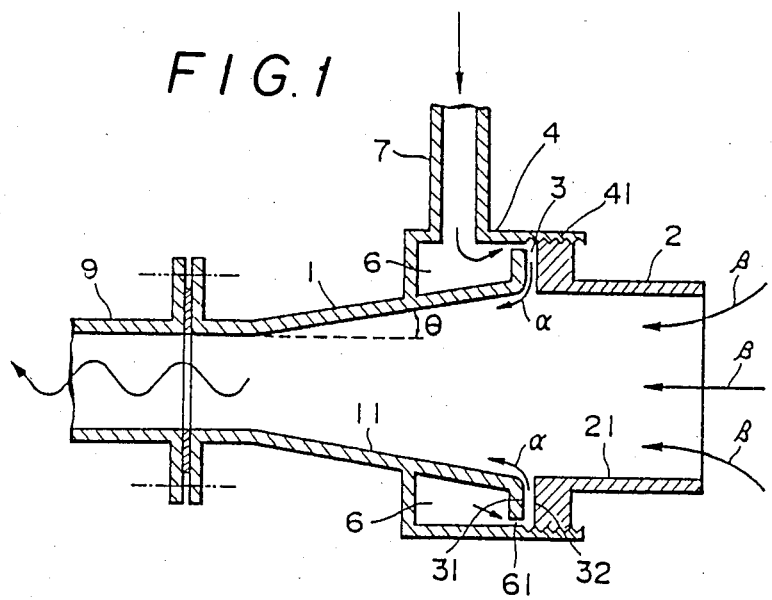
FIG. 1 is a cross-sectional view showing a first embodiment of the structure of the device of the present invention.

In FIG. 1 at an end of the large diameter side of a main cylinder 1 having a body portion whose diameter is larger than that of a pipe line 9 (on the left side in the drawing), a subcylinder 2 is connected to the main cylinder via an annular slit 3. A wall surface 31 of the annular slit 3 on the main cylinder side is smoothly curved so as to change to an inner wall 11 of the main cylinder, while a wall surface 32 of the annular slit 3 on the subcylinder side is bent so as to change to the inner wall 21 of the subcylinder 2. At an opposite end of the main cylinder 1 (on the left side in the drawing), a pipe line 9 is connected to the main cylinder 1 whose diameter is reduced gradually down to a diameter equal to that of the pipe line in conical fashion.

Figure 2:
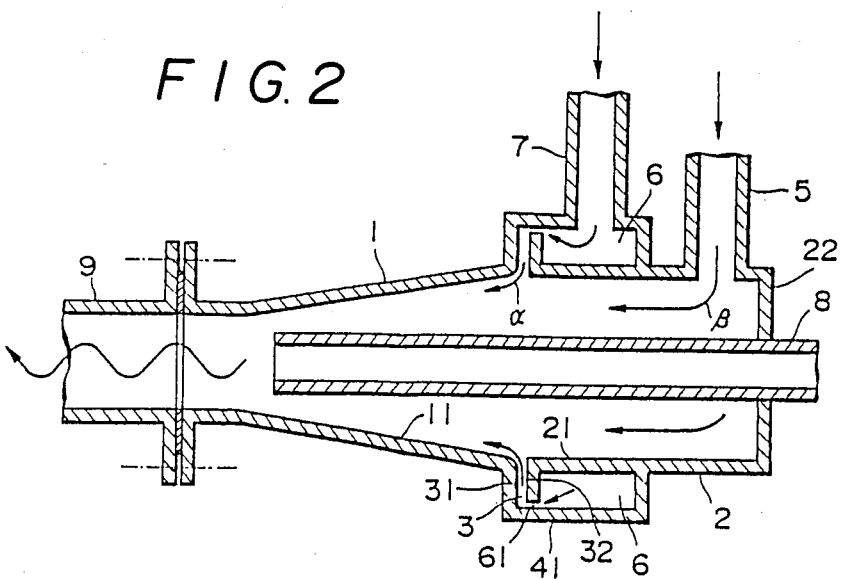
FIG. 2 is a cross-sectional view showing a conveyed substance supplying pipe for supplying substance to be conveyed into a spiral fluid flow generated by the device shown in FIG. 1.

As depicted in FIGS. 1 and 2, the main cylinder 1 can be formed in conical fashion starting directly from the annular slit. Alternatively, as depicted in FIGS. 3 and 4, the main cylinder 1 can be formed in the same fashion having a cylindrical portion 12 intervening between the conical cylinder 1 and the annular slit 3.

Figure 3:
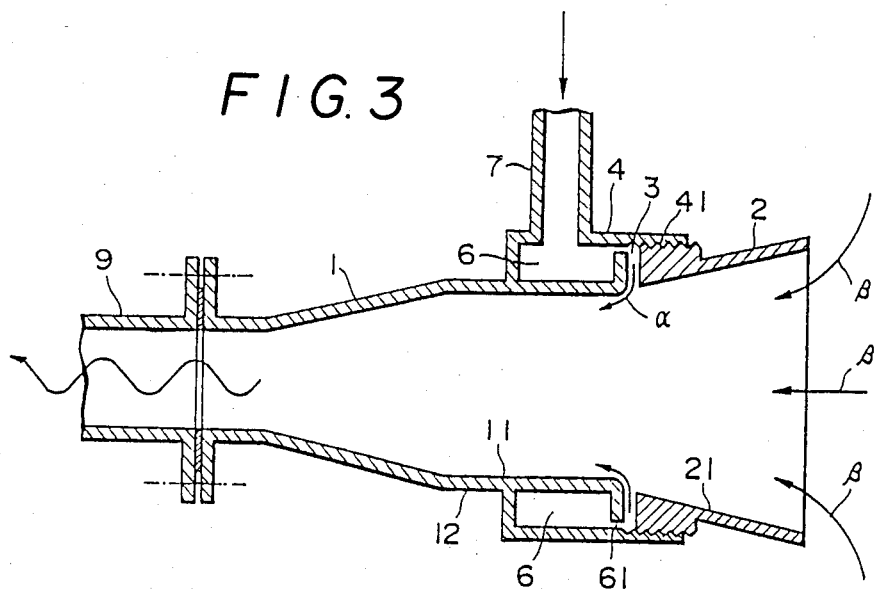
FIG. 3 is a cross-sectional view showing a second embodiment of the device of the present invention.
Figure 4:
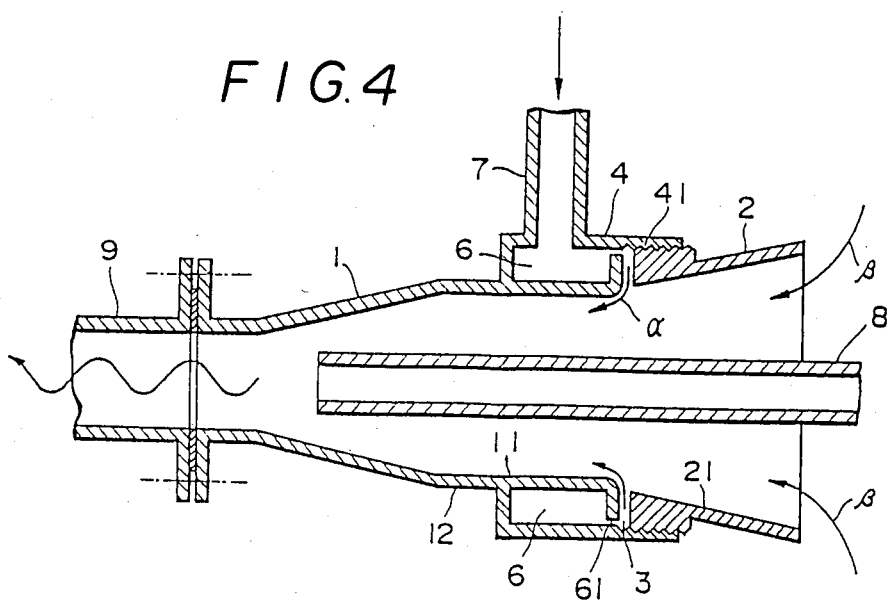
FIG. 4 is a cross-sectional view showing a conveyed substance supplying pipe for supplying substance to be conveyed into a spiral fluid flow generated by the device shown in FIG. 3.
Figure 9:
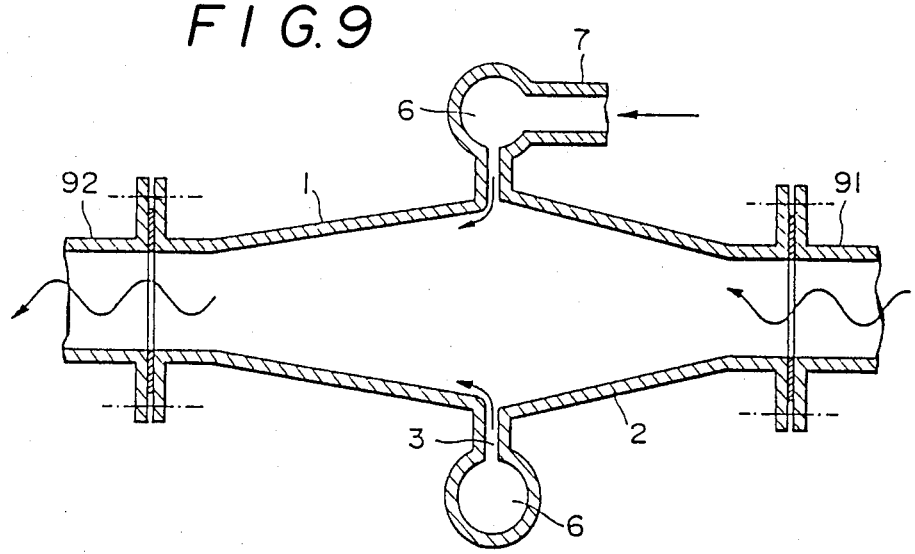
FIG. 9 is a cross-sectional view showing a device of the present invention, which is used as a booster being disposed midway of the pipe line.

In the case where a wall surface 32 of the slit 3 on the subcylinder side is bent at a right angle so as to change to an inner wall 21 of the subcylinder 2, the subcylinder 2 is a right cylinder in shape as shown in FIG. 1, while in the case where the wall surface 32 of the slit 3 on the subcylinder side is bent at on acute angle so as to change to the inner wall 21 of the subcylinder 2, the subcylinder 2 is an outward open cone in shape as shown in FIG. 3. Further, in the case where the wall surface 32 of the slit 3 on the subcylinder side is bent at an obtuse angle so as to change to the inner wall 21 of the subcylinder 2, the subcylinder 2 in an outward closed cone in shape as shown in FIG. 9.

Figure 5:
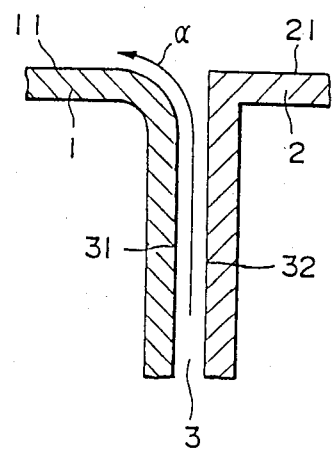
FIGS. 5, 6, 7 and 8 are enlarged fragmentary cross-sectional views showing the structure near the slit formed in the device according to the present invention.
Figure 6:
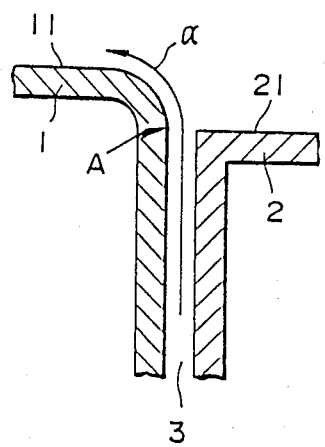
Figure 7:
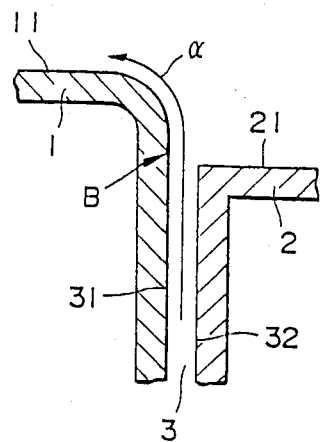

FIG. 5 to 7 show enlarged cross-sectional views of various slits embodied when the wall surface 32 of the slit 3 on the subcylinder side is bent at a right angle so as to change to the inner wall 21 of the subcylinder 2.

In FIG. 5, at an end position where the wall surface 31 of the slit 3 on the main cylinder side is smoothly curved and completely changes to the inner wall of the main cylinder 1, that is, at a position corresponding to the inner wall surface 11 of the main cylinder 1, the wall surface 32 of the slit 3 on the subcilnder side is bent so as to change to the inner wall 21 of the subcylinder 2. In FIG. 6, at a start position where the wall surface 31 of the slit 3 on the main cylinder side begins to be smoothly curved before changing to the inner wall 11 of the main cylinder, that is, at a position corresponding to point A, the wall surface 32 of the slit 3 on the subcylinder side is bent so as to change to the inner wall 21 of the subcylinder 2. In FIG. 7, before a start position where the wall surface 31 of the slit 3 on the main cylinder side begins to be smoothly curved before changing to the inner wall 11 of the cylinder 1; that is, at a position corresponding to point B, the inner wall 32 of the slit 3 on the subcylinder side in bent so as to change to the inner wall 21 of the subcylinder 2.

One of the slit structures as shown in FIGS. 5 to 7 is appropriately selected under the consideration of various factors such as the dimensions of the device, the pressure and the amount of flow of the pressurized fluid to be used, the kind of fluids in which a spiral flow is generated, further where the spiral stream is used for conveyance, the kind of substances to be conveyed, the specific gravity and the size thereof, etc., so that a desired object can be achieved on the basis of the minimum energy consumption.

Figure 8:
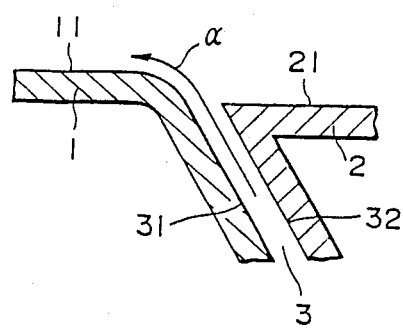

Further, it is possible to form the annular slit 3 in such a way as to be inclined as shown in FIG. 8, without being limited to those formed vertical with respect to the inner wall 11 of the main cylinder 1 as shown in FIGS. 5 to 7.

It is preferable to provide such a structure that the width of the annular slit 3 is freely adjustable at the junction between the main cylinder and the subcylinder, because the width should be adjusted according to the amount of fluid to be passed through the slit.

In practice, as shown in FIG. 1, 3 or 4, when an outer cylinder 4 directly joined to the main cylinder 1 is connected to be subcylinder 2 by means of thread structure 41, it is possible to freely adjust the width of the annular gap 3 by screwing the subcylinder 2 into the outer cylinder 4.

In the case where in fluid concerned with spiral flow is air, the outer side of the subcylinder can be opened to the atmosphere on the side remote from the slit as shown in FIGS. 1, 3 and 4. In the case of a fluid other than air, the outer side thereof is closed by a bottom plate 22 as shown in FIG. 2, and the fluid can be introduced through a secondary fluid introducing pipe 5.

The reason why the main cylinder having a body with a diameter larger than that of the pipe line is employed and further connected to the pipe line by gradually reducing the diameter thereof forward the end remote from the slit down to a value equal to that of the pipe line into a conical shape is that a radial direction vector can be applied to the fluid flowing through the main cylinder in the axial direction of the pipe line so as to readily generate a spiral movement.

The shape of the conical portion may be a truncated conical shape as shown in FIGS. 1 to 4; however, it is more preferable to form a shape which can permit smoother streamlines.

An angle of inclination $\theta$ of the conical portion (see FIG. 1) is preferably determined to about $\tan \theta = \frac{1}{4}$ to $\frac{1}{5}$. A throttled ratio of the conical portion, that is, a ratio of the main cylinder inner diameter to the pipe line inner diameter is preferably determined to about $\frac{1}{2}$ to 1/5. In other words, the ratio in cross section is about $\frac{1}{4}$ to 1/25. As a result, the flow speed of the fluid within the pipe line is to be increased to a value 4 to 25 times higher when that within the main cylinder.

An appropriate means can be adopted a means for supplying a pressurized fluid to the outer side of the annular slit (the outer wall side between the main cylinder 1 and the subcylinder 2). That is to say, as shown in FIGS. 1 to 4, a pressurized fluid distributing chamber 6 is provided so as to surround the main cylinder 1 (by utilizing the gap formed between the inner wall of the outer cylinder 4 joined to the main cylinder 1 and the outer wall of the main cylinder 1), in order to provide a communication of the pressurized fluid distributing chamber 6 with the outer side of the slit 3 via a communication part 61.

In this structure, if a fluid is introduced into the fluid chamber 6 from the outside through a pressurized fluid supply pipe 7, the pressurized fluid is uniformly supplied to the outer side of the annular slit 3 through the communication part 61.

Further, as shown in FIG. 9, it is also possible to direclty connect a hollow doughnut-shaped pressurized fluid distribution chamber 6 to the outer side of the annular slit 3.

Where the spiral fluid generating device is used for conveying solid particles or other substances to the conveyed through a pipe line, since such a phenomenon that an outside fluid is sucked into the inlet of the subcylinder develops, in the case where the substance to the conveyed is light, fine pulverulent substance, the substance can be conveyed in the direction of the pipe line, being sucked thereinto together with an external fluid by simply supplying the substance to near the inlet port of the subcylinder.

However, from the standpoints of the controlling of conveyed substance quantity or the prevention of dust, it is preferable to insert the conveyed substance supply pipe 8 from the outside of the subcylinder in the axial direction of the main cylinder, as depicted in FIG. 2 or 4, so as to introduce the conveyed substance through the pipe 8.

As means for supplying solid particles through the conveyed substance supply pipe 8, various known means such as screw conveyers can be freely adopted.

The operation of the device will be described hereinbelow by taking the typical example where the fluid is air in which a spiral fluid flow is generated.

When pressurized air (a primary fluid) is introduced into the inside of the slit 3 from the outside thereof at a high speed, the air describes streamlines (as shown by arrows $\alpha$ in FIGS. 1 to 4) being inclined toward the main cylinder at the outlet of the slit in dependence upon aerodynamics operation (known as Coanda effect); as a result, a vacuum area is produced on the subcylinder side of the streamlines. Since an external air (a secondary fluid) is introduced from the opposite side of the subcylinder to the vacuum area (as shown by the arrows $\beta$ in FIGS. 1 to 4), a motion vector of the air flow from the slit and that of the air flow from the outside of the subcylinder are compounded to form an air flow travelling toward the pipe line within the cylindrical pipe.

Further, the Coanda effect is referred to as a tendency such that a jet stream of gas or liquid flows near a curved wall surface along the direction thereof, even if the axial direction of jet stream is away from that of the curved wall surface, this effect being considered as to be applicable to fluid elements.

The quantity of the air flowing through the cylindrical pipe is increased to a value several times greater than that introduced into the slit, because the quantity of the air introduced from the subcylinder side is added thereto.

The pressure of the air introduced into the slit is preferably about 2 to 10 kg/cm$^2$.

A vector with a radial direction is applied to the air stream travelling within the cylindrical pipe toward the pipe line, because the stream is gradually reduced in diameter. This radial direction vector converts into a turning vector, thus resulting in a spiral movement in combination with the straight direction vector.

Under these conditions, there has already been a genarated a spiral flow turning on a pipe line cross section and travelling in the pipe line axial direction within an area several tens cm or less away from the pipe line inlet or at the conical portion of the main cylinder.

Since the spiral flow itself is gas, although it is impossible to directly observe the presence thereof by the naked eye, it is possible to confirm the presence of the spiral flow by the use of a device as described later.

The fact that a spiral flow will be generated when a fluid flows through a small-diameter passage in convergence state may be understood from the fact that a vortex will be generated near a drainage port of a bathtub being drained, for instance.

Although the most general fluid is the air, a spiral flow can be generated in various gases such as nitrogen, hydrogen, etc. or liquids such as water, slurry, etc., by the use of the device of the present invention.

It will offer no problem that the pressurized fluid (the primary fluid) introduced through the slit and the fluid (the secondary fluid) sucked into the subcylinder from the outside are the same or different from each other. For instance, the primary fluid is hydrogen and the seconary fluid is nitrogen. However, it is of course necessary that two mixed fluids should be combined appropriately so as not to cause an abnormal chemical reaction such as an explosion or other.

When a spiral flow is required in slurry, it is preferable to use water as the primary fluid and to supply slurry as the secondary fluid in order to present the slit being clogged.

As already described, a vector obtained perpendicular to the flow of fluid, that is, in the radial direction thereof produces a power for generating spiral movement.

In the device according to the present invention, a radial direction vector is obtained by throttling the fluid flow within the conical body and then converted into a turning vector. However, it is inevitable that the turning vector attenuates gradually when depending upon only the conical body. If another radial direction vector can be resupplied midway of the pipe line, it is possible to lengthen the staying distance of spiral fluid flow.

A method of applying a radial direction vector midway of the pipe line is to use a device of the present invention so constructed as shown in FIG. 9 as a booster arranged at regular spaced intervals midway of a long pipe line. In this device, the subcylinder 2 is formed in outward closed conical fashion when seen from the slit side as shown in FIG. 9. An end of the first pipe line 91 is connected to the small diameter and of the conical subcylinder 2 of the device and an end of the second pipe line 92 is connected to the small diameter end of the main conical cylinder 1 of the device.

Further, as another method of resupplying a radial direction vector midway of the pipe line, when the pipe line is made of an elastic material such as plastic tube or rubber tube (or rubber lining tube), since the elastic pipe line applies a radial direction vector in use on the basis of expansion and contraction motion toward the radial direction, it is possible to increase the staying distance of spiral fluid flow by connecting a pipe line made of an elastic material to the device according to the present invention.

EXAMPLE 1

Figure 10:
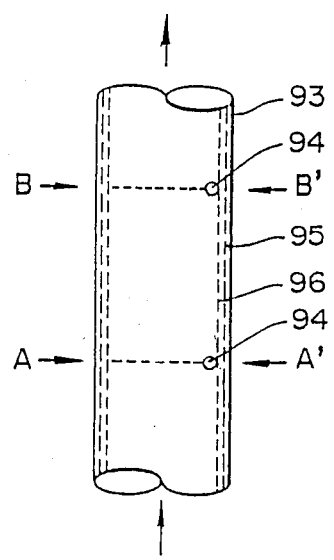
FIGS. 10 and 11 are illustrations for assistance in explaining an experiment for confirming the presence of a spiral fluid flow generated by the device of the present invention, in which a vertical transparent plastic tube is shown partially.

A vertical section 93 was provided for a pipe line using a transparent plastic tube with an inner diameter of 1.5 inch (38.1 mm) as shown in FIG. 10 in such a way that a spiral flow generated by the device as shown in FIG. 4 may flow from the lower portion to the upper portion thereof.

Figure 11:
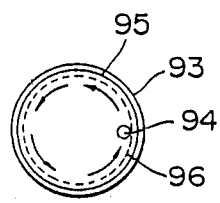

Synthetic resin pellets (5 mm-diameter and 5 mm-long right cylindrical shape) were fed through the conveyed substance supply pipe 8 of the device shown in FIG. 4. When the flow speed was sufficiently high, the pellets momentarily moved from the lower portion to the upper portion within this vertically arranged tube 93. However, if the flow speed was so adjusted that a downward direction vector due to the gravity of pellets matched an upward direction vector due to the stream, pellets stayed at a constant position within the vertical tube, for instance at position A—A in FIG. 10, thus permitting the movement to be observed by the naked eye. FIG. 11 is a cross-sectional view taken along the line A—A shown in FIG. 10, which illustrates that a pellet 94 is moving in turning motion as shown by the arrow.

When the A-A' portion was pinched by hand to reduce the diameter of the tube, since the flow speed increased at this portion, the pellet jumped upward and moved to a higher balance point B-B' while continuing the turning movement on the cross section. In this case, it should be noted that the pellets were not directly in contact with the inner wall 95 of the tube. This is because an annular compressed air layer 96 is formed near the tube inner wall 95 by a centrifugal force generated based upon the turning stream (the thickness of the annular air layer is shown in the drawing in an exaggerated manner; however, in plactice the thickness is on the order of micron). Therefore, the pellets are turning on a constant flat plane at the boundary area between the annular air layer and the pellets by a rotation vector of the spiral stream under the balanced condition between an upward direction vector of the spiral stream and a downward direction vector of the pellet gravity.

When the flow speed of the stream was increased beyond the balanced condition, it will be readily understood that pellets moved toward the outlet describing a spiral flow.

When the vertical tube was inclined gradually from the above state, pellets turning on a constant flat plane began to go up while continuing to rotate (i.e. a small pitch spiral flow was described). When the inclination angle reached a limit, pellets jumped toward the outlet (e.g. upward in this case).

EXAMPLE 2

A zoon long pipe line was laid down by using a transparent plastic tube with an inner diameter of 1.5 inch (38.1 mm ) with the outlet portion opened to atmosphere. The pipe line was arranged with some curved portions or height differences midway thereof. The device as shown in FIG. 4 was attached to an inlet portion of the pipe line, and the mean flow speed in the pipe line was adjusted to 26 m/see.

Synthetic resin pellets used in the first example 1 were continuously supplied through the conveyed substance supply tube 8 inserted in the axial direction of the main cylinder, and the pellets were observed by throwing a strobe flash over the pipe line. In this caes, it was confirmed that pellets traveled toward the outlet part while describing a spiral.

Further, it was also observed that the speed of the pellets passing near the center of the tube was faster than that of pellets moving near the wall of the tube; that is, an outrunning phenomenon was observed.

Further, in spite of the many-hour experiment, no scratches were found on the soft inner wall of the plastic tube.

EXAMPLE 3

By using the device of the present invention as shown in FIG. 2 in which the outside of the subcylinder 2 is closed, the secondary fluid introduction pipe 5 was connected to a water tank, and pressurized water was fed from the pressurized fluid supply pipe 7 to generate a spiral water flow within the transparent pipe line. When grains of rice were fed from the conveyed substance supply pipe 8, it was observed that rice grains traveled toward the outlet of the pipe line while generating the spiral movement.

As described above the effect of the method of generating a spiral flow and the device for achieving the method according to the present invention are prominent. These effects not realizable by the prior art technique can be summarized as follows:

(1) The device according to the present invention can readily generate a stable spiral fluid flow within a pipe line.

(2) Solid particles can be conveyed in dependence upon a spiral flow generated by the device according to the present invention. Further, since the annular compressed gas layer is formed at the inner wall of the pipe line to prevent solid particles in transit from being brought into direct contact with the pipe line wall, the piping material is free from wear.

(3) Since conveyed solid particles are not in direct contact with the piping material of the pipe line owing to the presence of the annular gas layer, the inner surface of the pipe arrangement is not contaminated by a specific substance. Therfore, it is possible to convey different kinds of solid particles continually by switching conveyed materials without cleaning the pipe line.

(4) It is possible to convey larged-sized solid particles, which have been difficult to be conveyed by the prior art air conveyance technique.

(5) Novel application fields can be expected such as pulverization, drying, separation, grinding, etc. in addition to the afore-mentioned transportation.

What is claimed is:

1. A method of generating a spiral fluid flow, comprising the steps of; preparing a device such that an annular-slit is formed between a large diameter end of a main conical cylinder having a small diameter end connectable to a long conveyance pipe line and an end of a subcylinder, an inner wall surface of the annular-slit on the main cylinder side being smoothly curved so as to change to an inner wall of the main cylinder, an angle of inclination $\theta$ of the conical portion being determined to $\tan \theta = \frac{1}{4}$ to $\frac{1}{8}$, an inner wall surface of the annularslit on the subcylinder side being sharply bent so as to change to an inner wall of the subcylinder; and supplying a pressurized gas through to the annular-slit to generate a high speed spiral flow within the long conveyance pipe line.

2. The method as set forth in claim 1, further comprising, introducing solid particles into said device to travel with said high speed spiral flow.

3. A device for generating a spiral fluid flow, comprising a structure such that a subcylinder is connected via an annular slit to an end of a large diameter side of a main cylinder having a body with a diameter larger than that of a long conveyance pipe line, a wall surface of said annular slit on the main cylinder side being smoothly curved so as to change to an inner wall of the main cylinder, a wall surface of said annular slit on the subcylinder side being bent so as to change to an inner wall of the subcylinder, an opposite end of the main cylinder being gradually reduced in diameter to such an extent as to be equal to a diameter of the long conveyance pipe line in conical shape for connection with the long conveyance pipe line, the angle of inclination $\theta$ of the conical portion being determined to $\tan \theta = \frac{1}{4}$ to $\frac{1}{8}$; and means for supplying a pressurized gas to an outer side of said annular slit.

4. The device as set forth in claim 3, wherein said annular slit formed at a junction between the main cylinder and the subcylinder is adjustable.

5. The device as set forth in claim 3, wherein a conveyed substance supply tube is arranged being inserted in the subcylinder from the outside thereof in the axial direction of the main cylinder.

6. The device as set forth in claim 3, wherein the device is connected to the long conveyance pipe line made of an elastic material.

* * * * *